Patented Aug. 7, 1951

2,563,289

UNITED STATES PATENT OFFICE 2,563,289

COATED GLASS FIBERS AND METHOD FOR PRODUCING SAME

Robert Steinman, Los Angeles, Calif., assignor to Owens-Corning Fiberglas Corporation, a corporation of Delaware No Drawing. Application June 12, 1947, Serial No. 754,270

10 Claims. (Cl. 117—126)

This invention relates to combinations of resinous materials and mineral fibers and, more specifically, to resinous materials reinforced with glass fibers as in laminates and other reinforced plastics and as a covering or binder for glass fibers in wools, mats, and coated textile fabrics.

An object of this invention is to produce combinations of resinous material and mineral fibers in which the constituents are strongly bonded one to another even in the presence of high humidities.

Another object is to produce a method for fabricating plastics and laminates of resinous material reinforced with mineral fibers characterized by high strength which is relatively unaffected by moisture conditions.

A further object is to produce a fabric of glass fibers strongly bonded one to another by a resinous material which has great affinity for the glass surface and which may be incorporated with other resinous materials, which are adherent to the first, or insolubilized on the fiber glass surface prior to the application of the other resinous material to the fibers, thereby to provide flexibility in the procedures.

A still further object is to effect the desired combinations above mentioned by means of a resinous material that may be applied to the mineral fiber surface in an aqueous medium, but after application is substantially unaffected by water.

A still further object is to effect the desired results merely by the application of resinous materials soluble in dilute acid solutions, but relatively insoluble and insensitive to water or alkali solutions once it is insolubilized on the surface of the mineral fibers.

Under normal atmospheric conditions, some resinous materials are regarded as being adherent to mineral fiber surfaces, but generally speaking, the adhesion of most of these resinous materials to the surfaces of mineral fibers is greatly reduced when in the presence of moisture. This reduction in bond strength is believed to result from the hydrophilic nature of the mineral fiber surface wherein it is preferentially wet by water.

Although a resinous film may be present on the surfaces of the mineral fibers, sufficient water is able to diffuse through the film to provide an intervening moisture layer, which reduces the adhesion tension between the film and the fiber surfaces. This is important for the reason that these mineral fibers are generally in the form of tubular bodies having a smooth outer wall, which does not provide for mechanical anchorage, as is the case in natural wool, cellulose, or cotton products, and for adherence reliance must be predicated principally on developed physicochemical forces. Consequently, when a moisture layer creeps in, the strength of a reinforced plastic or laminate is greatly reduced, the electrical resistant properties are greatly lowered and, not infrequently, the resinous film can be readily peeled from the fiber surfaces.

I have found that the objects of this invention can be achieved by the use of an amino polymer and preferably a resinous material containing one or more free basic amino groups that can be converted into an "onium" compound or an ionizable salt. These then dissociate in water to form a cationic-active substance containing the amine resin which, when insolubilized on the mineral fiber surfaces, strongly adheres thereto. In practicing the invention, I have found that the adherence is maintained even in the presence of water.

In specific application the amine resin appears to react with acids provided in an aqueous diluent to form the ionizable cationic, which wets the mineral fiber surfaces in preference to water, and, when insolubilized thereon, is thereafter water insensitive and strongly adherent to the mineral fiber surfaces. Alternatively, the amino resin may first be reacted with an acid or alkyl halide to form the "onium" compound or salt.

A segment of a suitable amine polymer may be described as having the general formula

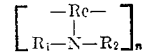

where $R_e$ illustrates a particular segment of the resinous molecule or chain, N is a nitrogen atom connected directly to a carbon of the resin chain or directly to a carbon on a group attached to the resin chain; N forms a primary amine when $R_1$ and $R_2$ are hydrogen atoms, secondary when either $R_1$ or $R_2$ is hydrogen and the other a monovalent organic radical, or tertiary, when $R_1$ and $R_2$ are both organic radicals of the type alkyl, aryl, aralkyl, or heterocyclic radicals, their substitution products or derivatives thereof. When N is a part of a heterocyclic group all three valences may be taken up in a quinoline or pyridine type structure which forms a part of the resin chain, or else two of its valences may be taken up by a morpholine type structure. It is to be understood that N may also be phosphorus or sulphur to comprise the corresponding phosphine or sulphide compositions.

When an amine polymer of the type described having one or more free basic amino groups is reacted with an acid or alkyl halide of the type R₃X, then the corresponding "onium" salt is formed which may be represented generally by the formula

or when ionized by

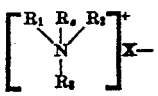

where N represents the amine portion of the amino resin, X is a salt forming anion of the type chlorine, bromine, iodine, sulphate, carbonate, phosphate, nitrate, acetate, formate, propionate and the like, and R₃ is hydrogen or a monovalent organic radical selected from the group including the alkyl, aryl, aralkyl or heterocyclic radicals or derivatives thereof and when alkyl or aralkyl it may be branched or straight chained, saturated or unsaturated substituted or unsubstituted. Suitable R₃ radicals may be represented by the groups methyl, ethyl, propyl, phenyl, benzyl, tolyl, cyclopentyl, naphthyl, methyl naphthyl, phenyl ethyl, allyl, methallyl, butenyl, and the like. If R₃ is an organic radical and N is a tertiary amine, the corresponding quarternary ammonium salt is formed. When R₃ is hydrogen R₃X comprises the corresponding inorganic or organic acid which then forms the "onium" salt with either a primary, secondary or tertiary amine.

Although the exact nature of the adhesion between these materials is not fully understood, it is believed that the effectiveness of the bond may be explained by the fact that the major portion of the surfaces of these siliceous fibers of glass, rock and slag are covered with oxygen atoms having highly electro-negative characteristics, and that these atoms attract the positively charged cationic-active radical and repel other anionic groups. Since the amine portion itself is the highly positive component it is believed that anchorage to the glass takes place through the amine group.

Some may prefer to consider that the improved adhesion results from the preferential attraction between highly polar amino groups in the resinous material and the highly polar oxy groups which predominate on the surface of the siliceous fibers. Whatever the reason may be, the forces of molecular attraction appear to be sufficiently strong to enable the resinous material preferentially to wet glass in the presence of water, and when the resinous material is insolubilized on the surface of the glass, the resinous bond thereafter appears to be strong and insensitive to moisture. This provides for considerable improvement in the strength of resinous plastics, laminates and coated or bonded fabrics of mineral fibers.

While many resinous polymers are known, not many of those in commercial use are constituted with an amine base capable of reaction to form an ionizable "onium" compound, which may be insolubilized on the surfaces of mineral fibers, and especially glass fibers. It appears that suitable resinous polymers can be and some are formed by the known methods of polymerization using amine monomers. These include monomeric aromatic or heterocyclic compounds constituted with a nitrogen atom which functions as an amine, as in pyridine, carbazole, aniline, pyrrole, and the like.

It appears also that amine groups may be incorporated into an already formed polymer by the processes of ammonolysis, aminolyses or by the reduction of suitable nitrogen containing groups. Obviously, the number of amino resinous polymers which might be converted into a cationic-active resinous material for application with glass fiber are too numerous to mention in great detail, and it is considered more expedient merely to describe suitable composition by the constituents as well as the processes by which they may be formed.

Representative of the amino polymers formed by the mechanism of condensation polymerization are the polyesterifications based on the known alkyd and polyamide resinous reactions. The desired amine polymer may be obtained by an alkyd type reaction if a hydroxy amino acid such as α-amino-β-hydroxypropionic acid, P-hydroxy-phenylalanine (tyrosine) or N-methyltyrosine is used instead of a hydroxy acid; or if a di- or polyhydroxy amine, such as triethanol amine, colamine and the like is substituted wholly or in part for the di- or polyhydric alcohol; or if an amino di- or polybasic acid such as pyridine dicarboxylic acids, quinolenic acid, lutidinic acid and the like is substituted wholly or in part for the di- or polybasic acid.

A resin having one or more free amine bases may be produced by the polyamide type reaction if an amino di- or polybasic acid, as above described, is substituted wholly or in part for the di- or polybasic acid; or if a polyamine having an excess of amino groups such as diethylene triamine, triethylene tetramine, spermin, diaminophenozine are substituted wholly or in part for the diamines.

Also included in the group of polymeric type condensation products containing free basic amines capable of "onium" salt formation, are the resinous materials known as polymeric imidazolines and their derivatives. These imidazoline compounds may be represented as

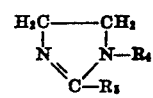

where R₅ is an alkyl, aryl or aralkyl radical of long or short carbon length or a derivative thereof and R₄ is an alkyl group of the type capable of resinification reaction by addition or condensation polymerization. For example, R₄ may be a polyamine, such as the radical of triethylene tetramine capable of esterification with a polycarboxylic acid, for example, phthalic acid, or of condensation reaction with an aldehyde, such as formaldehyde; it may be an unsaturated radical capable of addition polymerization, such as the vinyl group.

Other suitable amino resinous polymers which may be formed by the mechanism of condensation polymerization are of the aldol condensation type employing a nitrogenous material capable of resinification with an aldehyde. The reaction between hydantoin, dimethyl hydantoin or other substituted hydantoins with an aldehyde such as formaldehyde is illustrative, as are the resinous products formed by the reaction of aldehydes with Schiff's bases represented by the general formula RCH=NR, where R is alkyl, aryl, aralkyl or heterocyclic, such for example as benzal (benzylidene) amine.

In further specific application of the invention, a large number of amino resinous materials prepared by the mechanism of addition polymerization are capable of cationic activation and subsequent insolubilization on the mineral fiber surfaces. These may be taken to include the polymers formed of unsaturated monomers containing free basic amino groups. Such resinous monomers as the amides of acrylic, methacrylic or alkyl acrylic acids appear to be capable of addition polymerization in the manner of a polyacrylate. It is desirable first to form the acrylamide by the reaction of the desired acrylic acid with a polyamine of the type ethylenediamine, tetraethylene diamine, diethylene triamine, tetraethylene pentamine and the like, as represented by the following formulae:

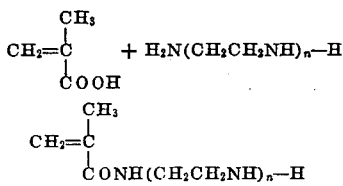

and then the amide polymerizes as follows:

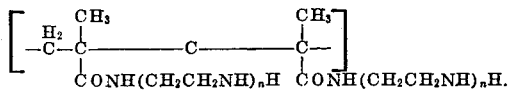

Amine resins of the type described may be prepared by following the procedures described in the United States Patent No. 2,146,210, issued on February 7, 1939 to Graves.

Another group of suitable polymerizable monomers are the N-vinyl derivatives of such amine compounds as carbazoles, pyrroles, indoles, tetrahydrocarbazoles, isopropyl carbazoles, imidazolines, triazoles, diazines. These are illustrated by the polymerization of N-vinyl derivatives such as N-vinyl pyrrolidene and N-vinyl hexahydrophthalimidene, as described in the United States Patent No. 2,265,450, issued on December 9, 1941, to Reppe et al.

In specific application of the invention, excellent results are derived when the amino resin employed is a polymer prepared from ortho-vinyl pyridine. These resinous materials are highly basic and readily formable into an "onium" salt capable of ionization into a cationic-active substance illustrated by the following formula,

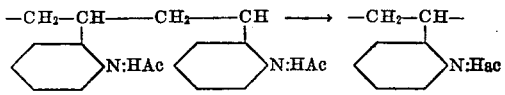

Other suitable amine resins may be prepared from ethylene imine following the procedure described in the British Patent No. 401,354, issued on February 15, 1937, and assigned to the I. G. Farbenindustrie.

I have found further that by the reactions of ammonolysis with ammonia, or aminolysis with an amine, polyamine or a substituted amine, or by the hydrogenation or reduction of a group containing a nitrogen, such for example, as a cyano or azo group, one or more suitable amine groups may be incorporated into an already formed polymer. This reaction is readily carried out with polymers containing a halogen connected directly to a carbon atom, as in polyvinyl chloride, vinyl chloride-vinylacetate copolymers, vinylidene chloride-vinyl chloride copolymers, chloroprene rubber, polytetrafluoroethylene, poly-dichlorostyrene, and the like. In the reaction, the replaced halogen and the hydrogen atom, if the reaction was effected by ammonolysis, or the alkyl radical if by aminolysis, generally combine to form the salt of the amine resin. This then is soluble or readily dispersible in aqueous medium and ionizable therein to form the cationic-active substance. In practice, it is expedient to incorporate into the aqueous medium a small percentage of the additional portion of the acids or acidic substances previously described.

I have found that when the amine resinous composition is constituted of multiple basic amino groups, capable of "onium" salt formation, uniformly interspersed substantially in a regular pattern throughout each of the polymeric molecules, greatly increased protection is afforded the fibers and the resulting adhesion, and correspondingly, the strength of the plastic or laminate is greatly improved. Theoretically the resinous molecule is then anchored to the fiber surface at a multiplicity of positions throughout each molecule, so that, even a mono-molecular layer appears sufficient to coat and to protect the fiber surfaces, although more may be used when desired.

This is unlike those cationic-active compositions wherein the amine group is disposed at one end of a long chain that is orientated away from the surface of the glass which, as a result, it can protect only a waving movement with the amine group as the pivot. In this form, only a small portion of the surface is actually covered and protected unless a large portion of the protective material is used.

Greatly improved protection, adhesion and coverage are obtained with resinous amines of the type described and this improved protection and coverage can be obtained with considerable economy of material costs, operating time and processing equipment.

It is to be considered within the concept of this invention to use these resinous materials as a prime coat or as a size on mineral fibers and especially glass fibers. In such instances, I have found that the prime coating adheres strongly to the glass surface and that this bond is maintained even in the presence of water. The prime coat may then serve as a base to which other resinous materials may be strongly bonded without loss of adherence of the prime coat, and without loss of interfacial adhesion of one material to the other at high moisture conditions. Thus, the cationic surface active resin may serve as a protective coating for the thin fibers, and also as an adhesion promoting agent having affinity for the resinous material and for the fiber surfaces to create a secure interbond between these materials, some of which were heretofore considered non-adherent to glass or else readily separable therefrom in the presence of moisture.

In application, the full complement of these cationic-active resinous amino compositions may be applied from dilute aqueous medium to glass filaments as they are mechanically drawn and collected into the form of a strand. When substantially dried, as by an air dry or by baking for 3 to 25 minutes at 200 to 350° F., these filaments each appear to be coated in a manner to prevent one fiber seizing another when collected in a package, and at the same time the coating functions effectively as a binder to hold the fibers together in the form of a strand.

If less than the full complement is applied it operates as the base on which an improved bond may be developed between these fibers and the same or other resinous material which may thereafter be applied in the usual manner in the fabrication of reinforced plastics, reinforced laminates and coated or bonded fibrous fabrics. Any of the resinous material adherent to the resinous composition from which the cationic-active composition was formed may be subsequently applied to the coated fibers with considerable advantage.

When oils, starchy or gelatinous binders are first applied to the filaments in the fabrication of the fibers into strands, yarns or textile fabrics, they preferably are removed by a heat treatment or an alkali wash before the cationic resinous materials are applied. The heat cleaned or washed glass fibers in strand, yarn or fabric form may then be coated or impregnated with cationic resinous material by any of the usual processes including applications by brushing or spraying, impregnation by flow coating, knife coating, or by a dip-squeeze process.

Where heavy applications of coatings are made, as in the manufacture of coated textile fabrics or plastic laminates, the coated fibers, strands or fabric may be baked at elevated temperatures to drive off the volatiles and harden the resin. I have noticed that heat also activated the molecule whereby the desired orientation and molecular rearrangements are effected which seem to provide for improved strengths.

When less than the full complement of resin is applied, as when used as a primer or as a binder in a size, concentrations ranging from 0.1 to 20 per cent of the cationic-active resinous materials in the aqueous medium appear to be sufficient. These cationic-active resinous materials may be incorporated as an additive to improve the adhesion of other materials. It is sufficient if from 3 to 50 parts by weight of the cationic resin are incorporated with 50 to 97 parts by weight of other resins which may include synthetic resins, proteins, waxes, asphaltics, rubbery materials and natural resins.

When used by itself as a coating or impregnating resin, it is preferable to maintain the amine resinous concentration in range of 10 to 60 per cent by weight of the coating composition. When used for the same purposes as an additive with other resinous materials, such for example as the phenolics, urea, polystyrene, polyvinyl resins and their copolymers, acrylates and alkylacrylates, polyesters, polyamides, allyl resins, natural and synthetic rubbers and other various materials and synthetic resins, the cationic resinous material may be incorporated in amounts ranging from 3 to 30 per cent by weight of the other resinous materials.

There is reason to believe the total solids content of resinous compositions employing the cationic resinous materials alone or in combinations with other resinous materials might be maintained at an even higher concentration than 60 per cent, for such applications as fabricating plastics and laminates. Such concentrations may even approach the solventless stage wherein only sufficient moisture is present to enable the desired degree of ionization of the cationic resinous material; in condensation type resinous reaction products sufficient moisture may result from the polymerization reaction.

When glass fibers having these resinous cationic materials insolubilized on the surfaces thereof are compared with glass fibers incorporated with other resinous materials which may be similar in arrangement and molecular weight, it becomes increasingly evident that the initial bond strength of the former, as measured by various standardized plastic and fabric strength tests, is far superior to the latter. When these tests are conducted at elevated humidities, or immediately after the test specimens have been exposed to moisture conditions for a length of time, marked superiority of the bond between the resinous materials containing the cationic-active resin or composed entirely of the cationic-active resin are clearly indicated.

Although in one aspect, this invention contemplates a product of manufacture consisting of a combination of mineral fibers having the full complement of these cationic resinous materials or mixtures thereof with other resinous materials strongly bonded, one to the other, even in the presence of moisture, it is to be understood that fibers treated with less than the full complement of these cationic resinous materials or mixtures thereof with other resins are also to be considered within the concept of this invention, because such treated fibers are products capable of preferentially receiving resinous materials in the fabrication of stronger, more resistant plastics, laminates, coated fabrics and bonded mats.

It is to be understood further that numerous amino resins other than those specifically set forth may be used, and other methods of application, and other combinations may be made without departing from the spirit of the invention, especially as defined in the following claims.

I claim:

1. An article of manufacture comprising glass fibers coated with an organic polymeric resinous compound containing the group

wherein the resinous component attaches to at least one of the free valences, $R_1$ and $R_2$ are selected from the group consisting of hydrogen, alkyl, aryl, aralkyl and heterocyclic radicals, and X is a highly ionizable anion.

2. An article of manufacture as claimed in claim 1 in which the highly ionizable anion comprises chlorine.

3. An article of manufacture as claimed in claim 1 in which the highly ionizable anion comprises bromine.

4. An article of manufacture as claimed in claim 1 in which the highly ionizable anion comprises acetate.

5. An article of manufacture as claimed in claim 1 in which the highly ionizable anion comprises propionate.

6. The method of coating glass fibers with a resinous material comprising the steps of coating the glass fibers with an organic polymeric resinous compound containing the group

wherein the resinous component attaches to at least one of the free valences, $R_1$ and $R_2$ are selected from the group consisting of hydrogen, alkyl, aryl, aralkyl and heterocyclic radicals, and X is a highly ionizable anion, and thereafter drying the coated glass fibers.

7. In the method of treating glass fibers as claimed in claim 6 in which the highly ionizable anion is chlorine.

8. In the method of treating glass fibers as claimed in claim 6 in which the highly ionizable anion is bromine.

9. In the method of treating glass fibers as claimed in claim 6 in which the highly ionizable anion is acetate.

10. An article of manufacture as claimed in claim 1 in which the organic polymeric resinous compound comprises the polymer of ortho-vinyl pyridine.

ROBERT STEINMAN.

REFERENCES CITED

The following references are of record in the file of this patent:

UNITED STATES PATENTS

| Number | Name | Date |
|---|---|---|
| 2,015,864 | Muller | Oct. 1, 1935 |
| 2,146,210 | Graves | Feb. 7, 1939 |
| 2,304,637 | Hardy | Dec. 8, 1942 |
| 2,311,548 | Jacobson | Feb. 16, 1943 |
| 2,356,542 | Sloan | Aug. 22, 1944 |
| 2,366,008 | D'Alelio | Dec. 26, 1944 |
| 2,417,513 | Nelles et al. | Mar. 18, 1947 |
| 2,431,745 | Flanagan | Dec. 2, 1947 |